DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 452

T905,004

PHOTOGRAPHIC ELEMENT AND PROCESS

James R. King, 224 Birch Lane, Webster, N.Y. 14580, and Grant M. Haist, 166 Valley Crest Road, Rochester, N.Y. 14616

Filed Oct. 1, 1971, Ser. No. 185,798

Int. Cl. G03c *1/58, 5/34*

U.S. Cl. 96—49

No Drawing. 12 Pages Specification

Light sensitive diazotype compositions employing as the azo-dye forming coupler a monohaloacetyl or alkylcarbamoyl ester of 2,3-dihydroxynaphthalene, e.g., 2,3-bis(chloroacetoxy)naphthalene or 2,3-bis(ethylcarbamoyloxy)naphthalene, exhibit desirable stability and shelf life without acidic stabilizers (precoupling inhibitors) and, after exposure, can be heat developed to yield an azo dye image. Development can be accomplished in the substantial absence of alkali.